Jan. 30, 1968     H. B. LLOYD     3,366,404
FLEXIBLE TUBULAR CONNECTOR
Filed Sept. 21, 1966     2 Sheets-Sheet 1
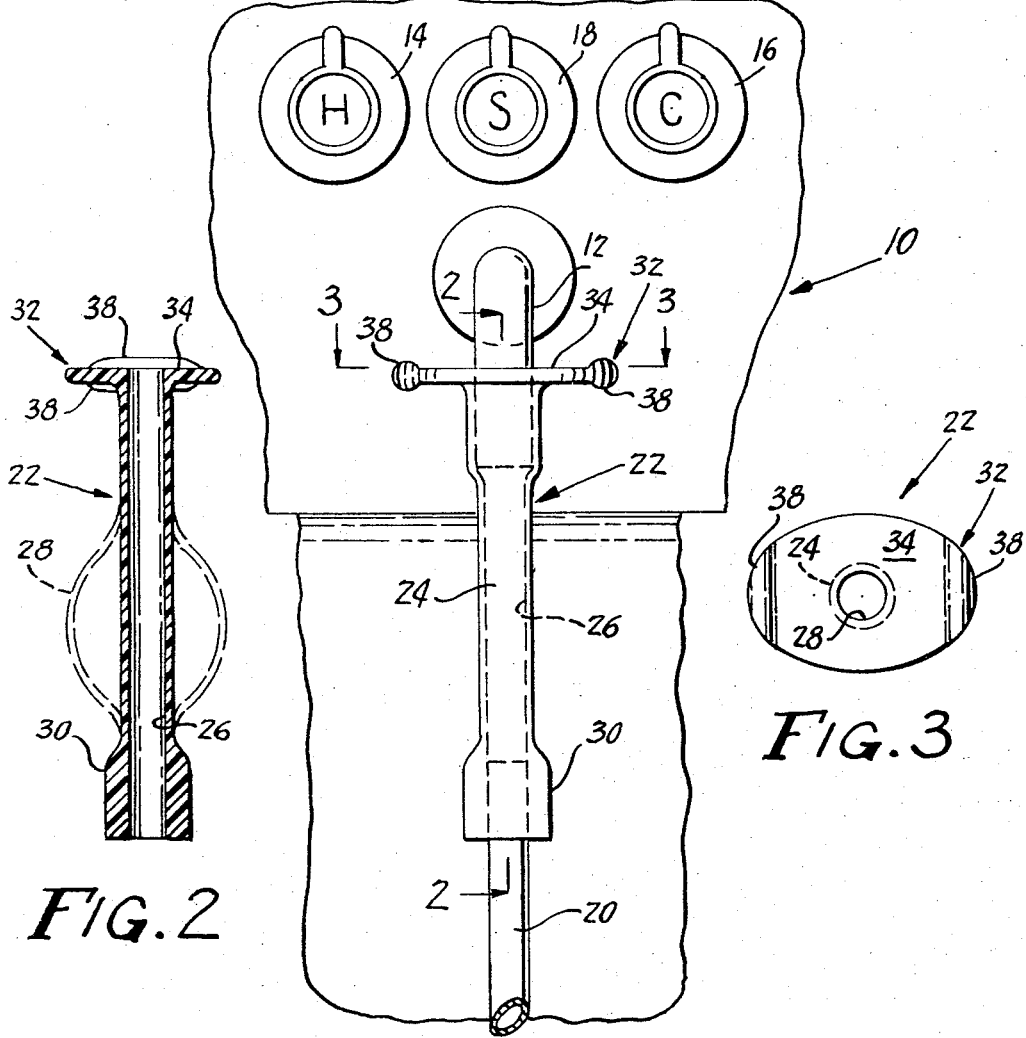
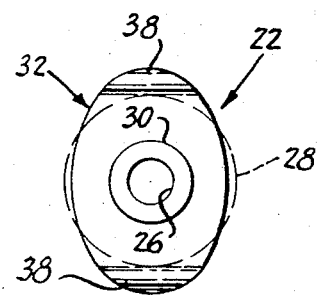
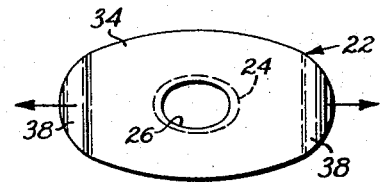
INVENTOR.
HAROLD B. LLOYD
BY *Kimmel, Crowell & Weaver*
ATTORNEYS.

Jan. 30, 1968   H. B. LLOYD   3,366,404
FLEXIBLE TUBULAR CONNECTOR
Filed Sept. 21, 1966   2 Sheets-Sheet 2

INVENTOR.
HAROLD B. LLOYD
BY *Kimmel, Crowell & Weaver*
ATTORNEYS.

United States Patent Office 3,366,404
Patented Jan. 30, 1968

3,366,404
FLEXIBLE TUBULAR CONNECTOR
Harold B. Lloyd, 2037 S. Cedar St.,
Sioux City, Iowa 51106
Continuation-in-part of application Ser. No. 490,980,
Sept. 28, 1965. This application Sept. 21, 1966, Ser.
No. 581,088
1 Claim. (Cl. 285—8)

ABSTRACT OF THE DISCLOSURE

Apparatus for connecting the adjacent ends of a pair of liquid conveying conduits, the apparatus or connector comprising a length of a hollow tubular conductor formed of elastic flexible material and having opposed inlet and outlet ends adapted for connection with the aforementioned pair of adjacent conduit ends, the inlet end of the connector including a lateral extension for manual manipulation to expand the inlet end in order to facilitate the mounting thereof on one of the pair of adjacent conduit ends, and the connector further being provided with a thickened outlet end portion reducing the elasticity and flexibility of the connector along this portion, the intermediate portion of the connector extending between its aforementioned ends comprising a relatively thin side wall capable of expansion to a bulbous configuration upon the presence of an abnormal condition of high back pressure in the connector.

---

This application is a continuation-in-part of my copending application Ser. No. 490,980, filed Sept. 28, 1965, entitled, Connector, and now abandoned. This invention relates to connectors for securing together conduits with the passage of fluid therethrough, and more particularly, to a flexible connector which may be pulled onto a rigid conduit outlet.

There are many situations in which it is necessary or desirable to connect a flexible conduit to a relatively inflexible stationary conduit, such as the placement of a nozzle upon a kitchen faucet, the positioning of a hair rinsing device upon a bathtub spigot, and many other applications where flexible conduits are inserted on relatively inflexible stationary outlets. In the past, the device could be attached to a fluid outlet if forcibly pushed thereon, requiring a great deal of effort since a pushing operation results in the apertured conduit wall frictionally resisting the attachment.

It has also been found desirable, under certain circumstances, to provide a connector for attachment to a relatively rigid spigot in which the connector expands to form a bulbous protuberance on the increase of pressure therein upon a certain point. This has been found advantageous in operating bathroom appliances such as disclosed in United States Patent 3,229,693.

It is a primary object of the instant invention to provide a connector which may be pulled onto a relatively rigid conduit outlet.

Another object of the instant invention is to provide a connector having an inlet opening adjacent which is provided handle grip means for elastically enlarging the inlet for receiving the terminal end of a relatively rigid conduit.

Still another object of the instant invention is to provide a connector of the type described having deformations upon a handle grip means positioned adjacent an elastically deformable inlet whereby an individual may grasp the deformations and elastically expand the inlet opening in order to insert it upon a relatively rigid terminal end of a fluid carrying conduit.

A further object of the instant invention is to provide a connector having a passageway which is elastically expandable upon an increase of pressure above a predetermined limit within the passageway.

A still further object of the instant invention is to provide a flexible connector which may be selectively positioned upon the terminal end of a spigot or the like, providing visible means for indicating the build-up of pressure within the connector above a predetermined limit.

A more specific object of the instant invention is to provide a flexible connector in which the central portion thereof is made of a material having a greater elastic characteristic than the ends whereby the center may expand on the increase of pressure within the connector.

Another object of the instant invention is to provide a connector of the type described which may be readily and inexpensively manufactured, which is conveniently attachable to a spigot, which is made of a long lasting, durable, rubber-like compound having the characteristics of high stretch and recoil.

Other objects and advantages of the instant invention reside in the combination of elements, arrangements of parts, and features of construction and operation, all as will be more fully pointed out hereinafter and disclosed in the accompanying drawings wherein there is shown a preferred embodiment of this inventive concept.

In the drawings:

FIGURE 1 is a front elevational view of the faucet connections and spigot of a bathtub, wash basin, sink or the like, to which is releasably secured a connector of the instant invention;

FIGURE 2 is a longitudinal cross-sectional view of the connector of FIGURE 1, taken substantially along line 2—2 thereof, illustrating in dashed lines a bulbous enlargement resulting from the increase in pressure within the connector above a predetermined limit;

FIGURE 3 is a top elevational view of the connector of FIGURES 1 and 2 as may be seen from along line 3—3 of FIGURE 1, viewing in the direction indicated by the arrows;

FIGURE 4 is a bottom view of the connector of FIGURE 2;

FIGURE 5 is a view of the connector of FIGURES 1 to 4 inclusive when forces are applied outwardly from the upper edge thereof thereby expanding the inlet end of the connector in order to receive the relatively rigid conduit outlet;

Figure 8:
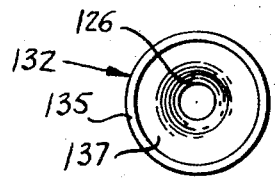
FIGURE 8 is a top elevational view of the connector of FIGURES 6 and 7.
Figure 7:
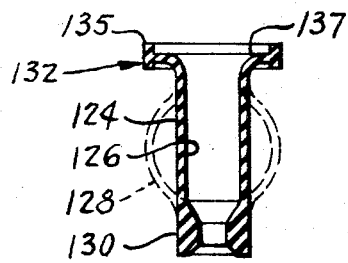
FIGURE 7 is a longitudinal cross-sectional view of the connector of FIGURE 6 taken substantially along line 7—7 thereof as viewed in the direction indicated by the arrows, illustrating in dashed lines a bulbous enlargement resulting from the increase in pressure within the connector above a predetermined limit.
Figure 9:
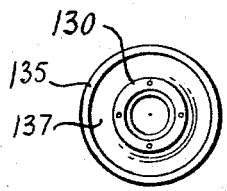
FIGURE 9 is a bottom view of the connector of FIGURE 7.

Referring now to the drawings in detail, wherein like reference characters designate like elements throughout the several views thereof, there is indicated generally at 10 a control panel for a bathtub, sink, wash basin or the like, having a relatively rigid spigot or outlet end of a conduit 12 through which water is delivered, controlled by a hot water knob 14 and a cold water knob 16 with a fluid diverting valve 18 being provided to deliver water or the like to a remote location, such as a shower. Releasably secured to the terminal end of the spigot 12 and providing communication between spigot 12 and a tubular conduit 20 is a flexible connector shown generally at 22.

Connector 22 includes a thin conduit 24 forming a passageway 26 made of an elastic material such as rubber, having a stretch characteristic whereby conduit 24 will form a bulbous enlargement 28 when the pressure within passageway 26 exceeds a predetermined limit. In one model, conduit 24 is .040 inch ± .005 inch in thickness to create bulbous enlargement 28 at a pressure differential across conduit of 24 of 2 p.s.i.

Conduit 24 includes an outlet end 30 which is illustrated as much thicker to provide an outlet end having an elastic characteristic much less than that of conduit 24, although it should be noted that the lesser elastic characteristic of outlet end 30 may be achieved by any other means, such as by the use of different materials or reinforced materials. Outlet end 30 preferably has a lesser elastic characteristic to avoid the expansion thereof as the predetermined pressure limit is approached to preclude the separation of conduits 20, 24 as the result of pressure build-up within passageway 26.

Connector 22 forms a handle grip shown generally at 32 surrounding the inlet end of conduit 24 for reasons analogous to the difference in elastic characteristics of outlet end 30 and conduit 24. Diaphragm 32 is made of a rubber-like material having characteristics of very high stretch and recoil, such as may be purchased from the Goodyear Rubber Company under the name of "Natsyn." Diaphragm 32 includes an elliptical or oval planar elastic section 34 having a long axis and a short axis with a plurality of deformations 38 residing on the long axis thereof. Deformations 38 are illustrated as a pair of half-cylindrical protuberances extending above and below planar section 34, but it should be understood that deformations 38 may be square or angled to provide a better gripping edge for the fingers of an individual.

In the attachment of connector 22 to spigot 12, protuberances 38 are grasped by an individual exerting a force outwardly from conduit 24, as may be seen by the arrows in FIGURE 5. In exerting these outward forces, elastic planar section 34 will be elongated with a consequent enlargement of the inlet end of passageway 26. Holding handle grip 32 in the position shown in FIGURE 5 allows an individual to pull connector 22 upwardly upon spigot 12, releasing protuberances or deformations 38 when there is sufficient interconnection between spigot 12 and conduit 24 to insure a secure connection. It should be apparent that passageway 26 may be made of any size necessary to accommodate enlarged or odd-shaped conduits.

Outlet end 30 is illustrated as a conventional push-on connecting means whereby tubular conduit 20 must be forcibly inserted into passageway 26. It should be understood, however, that outlet end 30 may be equipped with a handle grip means similar to that positioned on the inlet end of conduit 24, although it is preferred to utilize handle grip means 32 for connection to a relatively rigid terminus.

When either of control knobs 14, 16 are actuated to deliver fluid through spigot 12, the fluid will flow through passageway 26 into tubular conduit 20 in a known manner. When the pressure of the delivered fluid exceeds the pressure which conduit 24 will pass without extensive deformation, bulbous enlargement 28 will be created notifying an individual of the abnormally high delivery pressure at which time appropriate corrective action may be taken, such as by manipulating control knobs 14, 16. It should be apparent that the creation of bulbous enlargement 28 will decrease the discharge pressure from outlet end 30 of connector 22 because of the increased amount of liquids or fluids within passageway 26 creating an additional pressure loss due to fluid friction.

Referring now to the embodiment of FIGURES 6 to 10 inclusive, another embodiment of the instant invention is designated generally at 122. For purposes of brevity reference characters having common terminal and penultimate digits will be used to describe common elements.

Connector 122 includes a thin tubular conduit 124 including a closed conduit wall made of an elastic material, such as rubber, having a stretch characteristic whereby conduit 124 will form a bulbous enlargement 128 when the pressure within passageway 126 exceeds a predetermined limit in the same mode of operation as the embodiment of FIGURES 1 to 5.

The main differences between the embodiment of FIGURES 1 to 5 inclusive and the embodiment of FIGURES 6 to 10 inclusive resides in the configuration of outlet end 130 and the arrangement of handle grip means 132 and the connection thereof with conduit 124. Instead of the externally upset outlet end 30 of connector 22, outlet end 130 is provided with an internal upset to provide an elastic characteristic much less than that of conduit 124. Outlet end 130 preferably has a lesser elastic characteristic to avoid the expansion thereof as the predetermined pressure limit is approached to preclude the separation of conduits 120, 124 as the result of increased pressure within passageway 126.

Connector 122 forms a handle grip means shown generally at 132 surrounding at least a portion of the inlet end of conduit 124. Handle grip means 132 includes an annular ring 135 forming an enlargement providing a gripping lip in order to expand the inlet opening of connector 122 in accordance with the same mode of operation as the previous embodiment. Annular ring 135 is joined to conduit 124 by a flared wall 137 presenting an arcuate upper surface that is convex away from the inlet opening of conduit 124. As shown best in FIGURE 7, flared wall 137 is secured to ring 135 intermediate the upper end of lower ends thereof and preferably provides a bigger enlargement above flared wall 137 to accommodate some gripping.

An important feature of this embodiment of the instant invention is the shape and function of flared wall 137. It will be seen that flared wall 137 will provide a surface sloping toward conduit 124 in order to more readily receive relatively rigid conduit 112. It will also be apparent that flared wall 137 will not detract from the sealing capabilities of connector 122 since conduit 112 is received therein a substantial amount.

Figure 10:
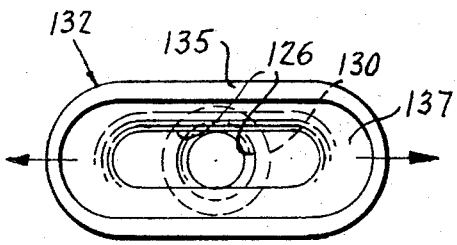
FIGURE 10 is a top view of the connector of FIGURES 6 to 9 inclusive when forces are applied outwardly from the upper edge thereof thereby enlarging the inlet opening in order to receive the outlet of the rigid conduit.
Figure 6:
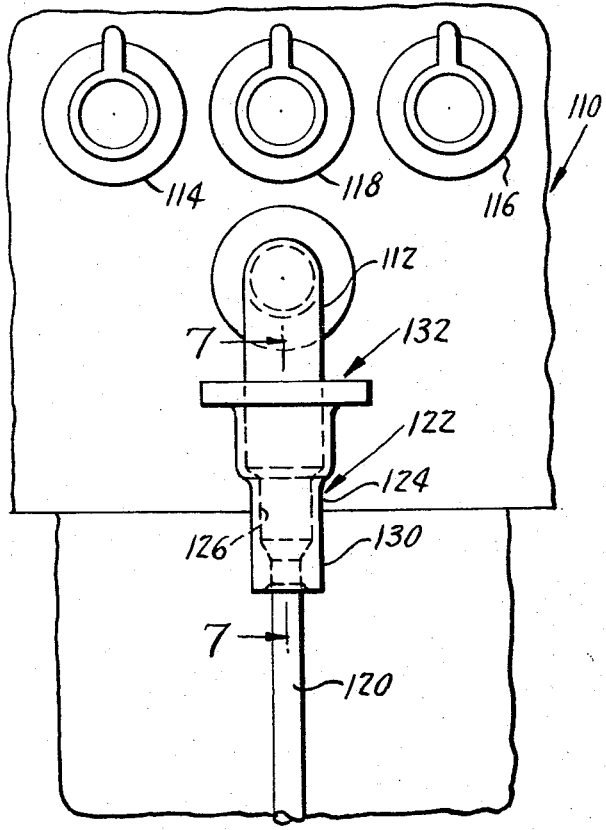
FIGURE 6 is a front elevational view of the faucet connections and spigot of a bathtub, wash basin, sink or the like, to which is releasably secured another embodiment of the connector of the instant invention.

In the attachment of connector 122 to spigot 112, annular ring 135 is grasped by an individual to exert a force outwardly from conduit 124 as may be seen by the arrows in FIGURE 10. In exerting these outward forces, elastic flared wall 137 will be elongated with a consequent enlargement of the inlet end of passageway 126. Holding handle grip 132 in the position shown in FIGURE 10 allows an individual to pull connector 122 upwardly upon spigot 112, releasing annular ring 135 when there is sufficient interconnection between spigot 112 and conduit 124 to insure a secure connection. It should be apparent that passageway 126 may be made of any size necessary to accommodate enlarged or odd shaped conduits.

Outlet end 130 is illustrated as a conventional push-on connecting means whereby tubular conduit 120 must be forcibly inserted into passageway 126. It should be understood, however, that outlet end 130 may be equipped with a handle grip means similar to that positioned on the end of conduit 124, although it is preferred to utilize handle grip means 132 for connection to a relatively rigid terminus.

It should be readily apparent that bulbous enlargement 128 of connector 122 acts to signify an abnormally high delivery pressure in the same manner that the device of FIGURES 1 to 5 operates.

It is now seen that there is herein provided an improved connector which accomplishes all of the objects and advantages of the instant invention and others, including many advantages of great practical utility and commercial importance.

Since many embodiments may be made of the instant inventive concept, and since many modifications may be made in the embodiment hereinbefore shown and described, such as for example, providing a longitudinal zone of high elastic characteristic through conduit 124, it is to be understood that the foregoing is to be interpreted merely as illustrative and not in a limting sense.

I claim:
1. A pull-on connector for attachment to a liquid conducting substantially rigid first conduit, said connector comprising a second elongated substantially hollow tubular conduit formed of a flexible elastic and resilient material, said conduit having a continuous passageway formed therein and in open communication with a pair of opposed ends of said second conduit, said passageway being of substantially uniform transverse cross-sectional area between said opposed ends, and said opposed ends comprising the inlet and outlet ends of said second conduit, said passageway further being of such transverse cross-sectional area as to form a thin continuous side wall of substantially uniform thickness between said inlet and outlet ends of said second conduit, whereby said thin side wall expands to form a bulbous protuberance on the increase of pressure therein above a predetermined limit;

said side wall having an integral portion thereof adjacent said outlet end of said second conduit thickened to increase the rigidity of said side wall along the extent of said portion, said thickened portion being directed inwardly of said side wall to reduce said transverse cross-sectional area of said passage along said thickened portion, said thickened portion having a cylindrical opening adapted to be connected to a tubular member; and handle grip means disposed adjacent said inlet end of said second conduit and being integrally formed therewith;

said handle grip means comprising an outwardly flared annular wall having an outwardly facing convex surface at substantially the junction of said annular wall with said outlet end of said second conduit, said annular wall having substantially the same wall thickness as said side wall and extending substantially radially outwardly and having an outer periphery, said outer periphery having a diameter greater than the outside diameter of said side wall, and an annular member integrally connected intermediate its opposed ends to the outer periphery of said annular wall and having portions thereof extending beyond the opposed sides of said annular wall.

References Cited

UNITED STATES PATENTS

| 937,458 | 10/1909 | Mulherin | 285—8 X |
| 947,461 | 1/1910 | Skiff | 285—8 |
| 1,583,019 | 5/1926 | Simmons | 215—41 |
| 2,070,377 | 2/1937 | Simmons | 215—41 |
| 2,071,842 | 2/1937 | Kennedy | 285—8 |
| 2,218,308 | 10/1940 | Comer | 215—41 |
| 3,129,894 | 4/1964 | Schermerhorn | 285—8 X |

FOREIGN PATENTS 582,953  10/1958  Italy.

CARL W. TOMLIN, *Primary Examiner.*

THOMAS F. CALLAGHAN, *Examiner.*